United States Patent [19]

Miller et al.

[11] Patent Number: 6,017,132

[45] Date of Patent: Jan. 25, 2000

[54] DECORATIVE LIGHT-SUPPORTING STRUCTURE FOR HOLDING CONNECTED STRING OF LIGHTS

[76] Inventors: Donna R. Miller; Kenneth B. Miller, both of 3969 Guasti Rd. Unit D, Ontario, Calif. 91761

[21] Appl. No.: 08/738,871

[22] Filed: Oct. 28, 1996

Related U.S. Application Data

[63] Continuation-in-part of application No. 08/594,085, Jan. 30, 1996, Pat. No. 5,568,966, which is a continuation of application No. 08/325,576, Oct. 19, 1994, Pat. No. 5,488,549.

[51] Int. Cl.⁷ .......................................................... F21P 1/00
[52] U.S. Cl. .......................... 362/252; 362/806; 362/122; 362/391; 362/249
[58] Field of Search ..................................... 362/252, 249, 362/806, 808, 122, 391; 428/10; 206/419, 420, 421

[56] References Cited

U.S. PATENT DOCUMENTS

| | | |
|---|---|---|
| D. 236,216 | 8/1975 | Fred . |
| D. 269,392 | 6/1983 | Breen . |
| D. 288,074 | 2/1987 | Vogel . |
| D. 323,634 | 2/1992 | Green . |
| D. 325,358 | 4/1992 | Johnson . |
| D. 325,887 | 5/1992 | Vodhanel, Jr. . |
| D. 357,432 | 4/1995 | Snodgrass . |
| D. 363,685 | 10/1995 | Miller et al. . |
| 1,778,597 | 10/1930 | Herzog . |
| 2,806,938 | 9/1957 | Henry . |
| 2,864,192 | 12/1958 | Shoalts . |
| 3,674,612 | 7/1972 | Gehl, Jr. . |
| 3,676,275 | 7/1972 | Sloane . |
| 3,704,366 | 11/1972 | Korb et al. . |
| 3,735,117 | 5/1973 | Hunt . |
| 3,789,526 | 2/1974 | Lavinson . |
| 3,819,459 | 6/1974 | Wren . |
| 4,620,270 | 10/1986 | Laakso . |
| 4,736,282 | 4/1988 | Ahroni . |
| 4,746,022 | 5/1988 | Benham . |
| 4,979,085 | 12/1990 | Voorhees . |
| 5,094,893 | 3/1992 | Snider . |
| 5,359,502 | 10/1994 | Cantin . |
| 5,488,549 | 1/1996 | Miller et al. . |
| 5,568,966 | 10/1996 | Miller et al. . |
| 5,788,361 | 8/1998 | Lee .......................................... 362/249 |

*Primary Examiner*—Sandra O'Shea
*Assistant Examiner*—Michael J. Smith
*Attorney, Agent, or Firm*—Myers, Dawes & Andras LLP

[57] ABSTRACT

A decorative light-supporting structure is disclosed. In a first form, the structure simulates a lighted tree and preferably includes three rigid supports. The lower ends of the rigid supports hold the decorative light-supporting structure above a surface, a lower skirt detachably connects the three rigid supports near their lower ends, and a cap detachably fits over and joins the upper ends of the rigid supports. The cap has a plurality of protrusions extending from an upper surface of the cap to facilitate wrapping of a string of lights over the upper surface and between the protrusions. A bottom edge of the lower skirt has a plurality of skirt protrusions to facilitate wrapping of the string of lights between the cap and the plurality of skirt protrusions. Each wrap routes the string of lights from a skirt protrusion to the upper surface and back down to and around another skirt protrusion.

A second form of the invention provides an overall structure that has the shape and volume of a holiday item such as a wreath or a candy cane. Several component members having component edges are detachably connected to one another to form the overall structure and, moreover, to form a compound edge which includes light-routing protrusions for wrapping a string of lights in close conformance to the overall structure. As a result, the overall structure takes on the shape and volume of the holiday item even when unlighted.

25 Claims, 7 Drawing Sheets

DECORATIVE LIGHT-SUPPORTING STRUCTURE FOR HOLDING CONNECTED STRING OF LIGHTS

This application is a continuation-in-part of U.S. patent application Ser. No. 08/594,085, filed on Jan. 30, 1996, now issued as U.S. Pat. No. 5,568,966, which application is a continuation of U.S. patent application Ser. No. 08/325,576, filed on Oct. 19, 1994, now issued as U.S. Pat. No. 5,488,549.

BACKGROUND OF THE INVENTION

1. Field of the Invention

The present invention relates generally to a decorative light-supporting structure for holding connected strings of lights.

2. Description of Related Art

Decorative light-supporting structures are often expensive and cumbersome to assemble and store. Many light-supporting structures are sold with preaffixed lights making them especially expensive. Some structures include metal parts which can be heavy, as well as dangerous in the event of an electrical short.

Artificial Christmas trees, for example, often include a trunk and numerous branches that are expensive, complex, and time consuming to assemble and store. The numerous branches must be sufficiently strong, and are angled upwards to prevent excessive sagging of the branches from the weight of the lights. Additionally, the trunks are often made of several trunk pieces. The number of the trunk pieces may be changed to vary the height of the tree. If the trunk pieces are not firmly fastened together, a user lifting the tree from a top portion of the trunk can sever the trunk. Thus, the lights burden the branches with a downward force and do not hold the tree together when lifted.

The prior art has proposed light-supporting frames which resemble a lighted tree at night, but these designs are often complex. For example, U.S. Pat. No. 5,094,893 to Snider discloses a light-supporting frame which draws support from a large number of guy wires. The metal guy wires present an electrical hazard, and add to the assembly time for the tree. Ends of guy wires can puncture fingers, and the wires and stakes are cumbersome to disassemble and store.

SUMMARY OF THE INVENTION

The present invention provides a decorative light-supporting structure that is both inexpensive and simple in design. The present invention does not need to be sold with lights preaffixed and further does not need specially manufactured lights. Moreover, the present invention is comprised entirely of plastic parts so that it is lightweight, easily packed and stored, and safe from electrical malfunctions.

A first embodiment of the present invention is directed to an artificial Christmas tree. It preferably uses a simple tripod design that does not require a trunk and numerous branches attached thereto. Moreover, when conventional lights are wrapped vertically onto the structure, they do not promote sagging of the tree, but rather add support and stability to the tripod structure, enabling the structure to be lifted even from an upper portion of the structure.

The first embodiment more particularly provides a decorative light-supporting structure having three rigid supports. The lower ends of the rigid supports hold the decorative light-supporting structure above a surface. A lower skirt detachably connects the three rigid supports near their lower ends, and a cap detachably fits over and joins the upper ends of the rigid supports. The cap has a plurality of protrusions extending from an upper surface of the cap to facilitate wrapping of a string of lights between or around the protrusions. A bottom edge of the lower skirt has a plurality of skirt protrusions, to facilitate rapid wrapping of the string of lights, up and down, between the cap and successive skirt protrusions on the opposite side.

A second embodiment of the present invention is directed to an overall structure resembling any desired holiday item. It provides a decorative light-supporting structure for supportively routing a string of lights about the overall structure. The preferred light-supporting structure comprises a plurality of component members that collectively form the larger, overall structure. The component members include an upper light-supporting surface which terminates at a lower edge, wherein the upper light-supporting surface defines a three dimensional volume that is a component part of a larger three dimensional volume of the overall structure. The preferred structure further includes means for detachably connecting the component members which may be disconnected from one another for storage or connected together to form the overall structure. Finally, the overall structure includes a perimeter edge with a plurality of light-routing members extending therefrom so that a string of lights may be routed back-and-forth between the light-routing members, over and against the upper light-supporting surfaces of the component members, to closely conform the string of lights to the shape of the overall structure. The overall structure and closely wound string of lights depict the holiday item by shape, volume and illumination when the lights are on and by shape and volume even when the lights are off.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically.

Figures 1, 3, 4, 5:
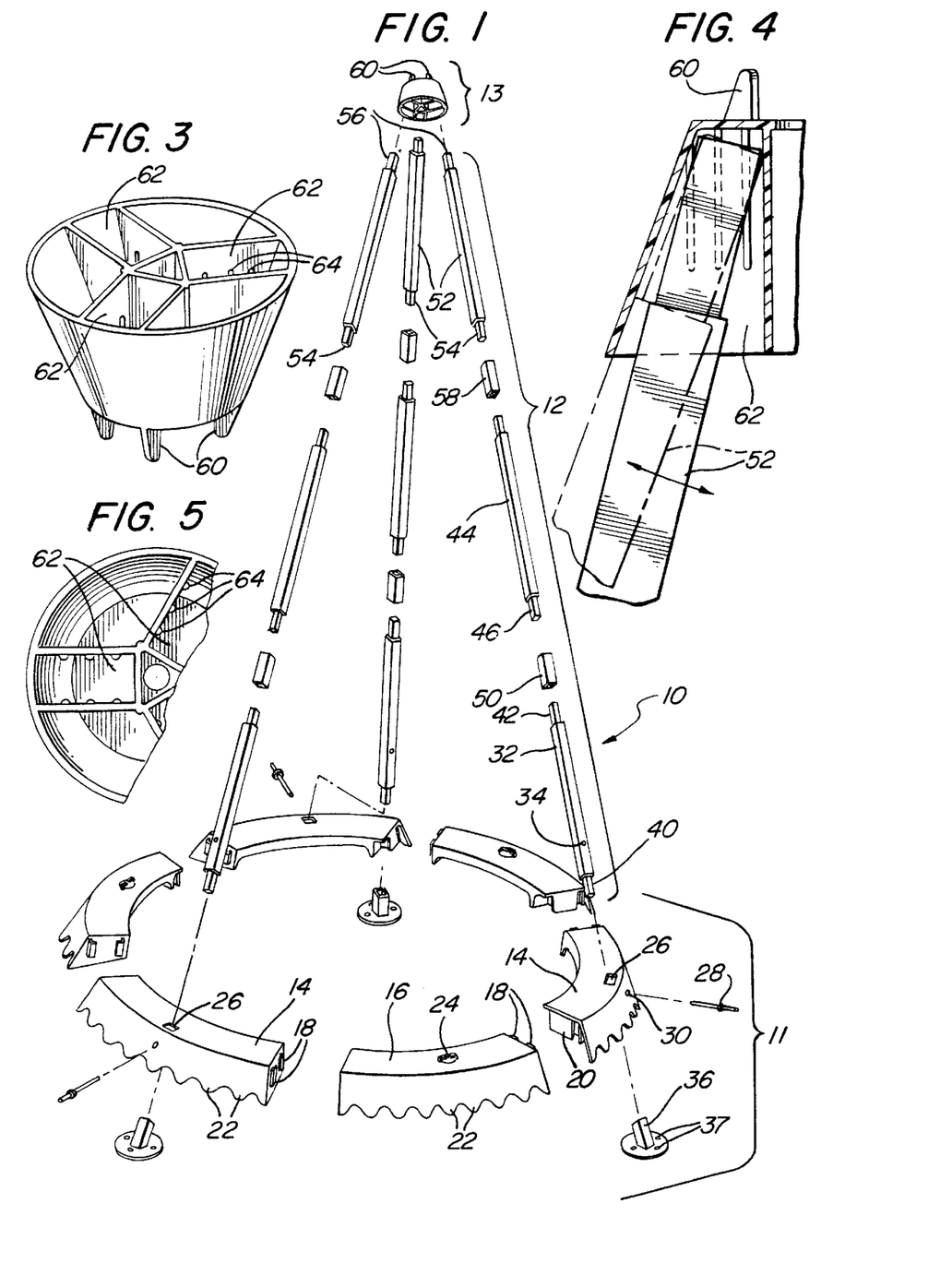
FIG. 1 is an exploded diagram of a first preferred decorative light-supporting structure of the invention constructed at an intermediate height.
FIG. 3 is a perspective view of the cap of the first preferred embodiment which fits at the top of the decorative light supporting structure.
FIG. 4 is a cross-section of the cap of the first preferred embodiment.
FIG. 5 is a bottom plan view of the cap of the first preferred embodiment.

FIGS. 1 to 6 show a first preferred embodiment which generally depicts a Christmas tree. FIG. 1 is an exploded view of this first preferred light supporting structure 10. It generally comprises a lower light-routing means 11 for contacting and routing a connected string of lights, an extending means 12 for extending above the lower light-routing means, and an upper light-routing means 13 for also contacting and routing the connected string of lights. As presently embodied, the lower light-routing means 11 comprises a plurality of parts which form a lower skirt having skirt protrusions on a bottom edge. Alternatively, the lower light-routing means may comprise a square, triangular, or any other polygonal shape, and may be supported above or directly on a surface. In the first preferred embodiment, the lower skirt comprises three primary skirt members 14 and three secondary skirt members 16. Each of the six skirt members has two folded tabs 18 on a first end and a tongue 20 on a second end. Each of the six skirt members interconnects with adjacent skirt members by inserting a tongue 20 between two folding tabs 18. Alternatively, the skirt members may be connected using conventional fastening means, such as pins, tabs, screws, etc.

The three primary skirt members 14 and the three secondary skirt members 16, along with the other parts shown in FIG. 1, are formed of plastic in the first preferred embodiment. Each of the skirt members has a side wall and a bottom edge with skirt protrusions 22 thereon. Alternatively the skirt protrusions may comprise integrally-formed hooks, tabs notches, etc., and may be located on the upper, lower, inner, or outer edges or surfaces of the skirt members. Each of the three secondary skirt members 16 has a cord holder 24 formed on an upper surface thereof. The cord holder holds a portion of the string of lights securely to the upper surface of the skirt member 16 to keep extension/power cords connecting strings of lights out of puddles and off of grass.

Each of the primary skirt members 14 includes a rigid-support aperture 26 on an upper surface thereof. Each rigid support aperture 26 accommodates a corresponding bottom rigid support member 32. First male protrusions 40 of each of the bottom rigid support members 32 fit through the rigid support apertures 26 into feet 36. The feet 36 support the decorative light-supporting structure 10 above a surface. Each foot 36 has three foot apertures 37 for accommodating screws, bolts, nails, stakes, or other fastening means to firmly secure each foot onto a surface.

Pins 28 fit into pin apertures 30 in each of the primary skirt members 14, and further fit into pin apertures 34 in the bottom rigid support members 32. The pins 28 firmly secure the bottom rigid support members 32 to the primary skirt members 14. Other fastening means, such as locking tabs on the bottom rigid support members 32, may also be used.

Connected to and supported above the lower light-routing means 11 of the decorative light-supporting structure 10 is an extending means 12. As presently embodied, the extending means 12 comprises three rigid supports. Alternatively, the extending means 12 may comprise two, four, or more supports that are straight or curved, and are rigid or flexible.

Figures 2, 6:
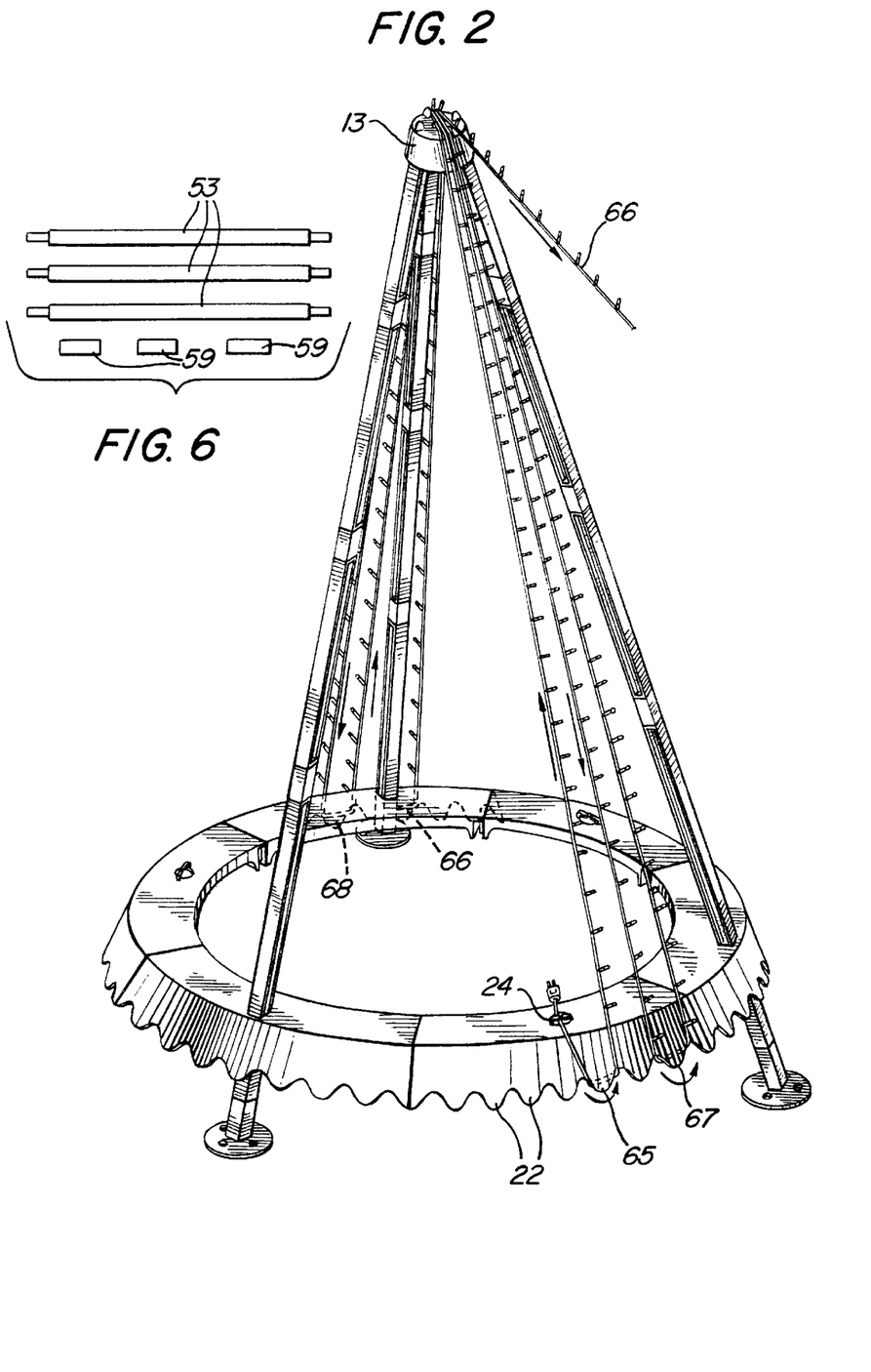
FIG. 2 is a perspective view of the first preferred decorative light-supporting structure of the presently preferred embodiment having a portion of the string of lights assembled thereupon.
FIG. 6 is a perspective view of three unused support members, which can be added to increase the height of the first preferred decorative light-supporting structure.

Each of the rigid supports can be assembled using up to four support members, as presently embodied, depending on a desired height. FIG. 1 shows an intermediate-height configuration where a user has decided to use only three of the available four support members for each rigid support. In these figures, the rigid supports comprise the above-mentioned bottom rigid support members 32, middle rigid support members 44, and top rigid support member 52. The three unused rigid support member 53 and connectors 59 are shown in FIG. 6. Alternatively each support may comprise one or any plurality of support members. FIG. 2 shows a full-height configuration using all four support members.

The bottom rigid support member 32 includes both a first male protrusion 40 and a second male protrusion 42. Similarly, each middle rigid support member 44 includes a first male protrusion 46 and a second male protrusion 48, and each top rigid support member 52 includes a first male protrusion 54 and a second male protrusion 56.

The bottom rigid support members 32 are connected to the middle rigid support member 44 with bottom rigid arm connectors 50. Each bottom rigid arm connector 50 fits over the second male protrusion 42 of a bottom rigid support member 32 and over the first male protrusion 46 of a middle rigid support member 44. Similarly, each upper rigid arm connector 58 connects a middle rigid support member 44 with a top rigid support member 52.

The upper light routing means of the decorative light supporting structure 10 preferably comprises a cap 13 with four protrusions 60 located thereon for supporting and guiding the string of lights over the cap 13. Alternatively, the upper light-routing means may comprise a rectangular, triangular, or any other polygonal shape or other shape that can hold the three male protrusions 56 or the support member 52 together. Similarly, the four protrusions 60 of the upper light-routing means may be of any number and shape, such as a plurality of hooks around the perimeter of a cap, for example. There may be more or less than four protrusions. For example, the four protrusions may be replaced by a single protrusion, wherein the string of lights is wrapped around this single protrusion and back down. Further, the upper light-routing means may comprise a fastening element, such as a string, for securing the top rigid support member 52 together at locations below the male protrusions 56, so that protrusions of the rigid support members 52 extend above the fastening element, for example.

In an intermediate height configuration of the first preferred embodiment, the cap 13 detachably accommodates the second male protrusions 56 of the top rigid support members 52. As shown in FIGS. 3 and 5, the second male protrusions 56 of the top rigid support member 52 fit into the three rigid support receiving apertures 62. Each of the rigid support receiving apertures 62 includes reinforcing ribs 64 for extra strength and tightness of fit with angle flexibility to hold various top heights. Of course, in the maximum height configuration of the first preferred embodiment, which uses all four rigid support members for each rigid support, the cap 13 accommodates male protrusions of the support members 53 of FIG. 6.

FIG. 4 shows a cross-sectional view of the cap 13 with a top rigid support member 52 inserted into one of the rigid support receiving apertures 62. The phantom drawing of the top rigid support 52 shows how this top rigid support member 52 fits into a rigid support receiving aperture 62 when the decorative light-supporting structure 10 is formed as a shorter height. For example, this phantom drawing may correspond to a configuration where the rigid supports comprise only the bottom rigid support member 32 and the top rigid support members 52.

Turning to FIG. 2, the decorative light supporting structure 10 of the first preferred embodiment is shown assembled at an intermediate height and partially covered with a string of lights 66. The string of lights 66 is woven between the skirt protrusions 22 and the cap 13. For example, a user first places the cord of the string of lights into the cord holder 24 and then wraps the string of lights around the skirt protrusion 65 located nearest and to the right of the cord holder 24. In the first preferred embodiment, the string of lights in then folded over the top of the cap 13 and back down and around a skirt protrusion 66 located 180 degrees opposite the cord holder 24. The string of lights is moved from the skirt protrusion 66 up to and back over the cap 13, and back down and around a skirt protrusion 67 located to the right of and second from the cord holder 24. The string of lights is then wrapped back over the cap 13 and around a skirt protrusion 68, and back up and over the cap 23 again. This process is continued until each of the skirt protrusions 22 of the decorative light supporting structure 10 has a portion of the string of lights wrapped therearound. In other words, the string of lights is wrapped around the skirt protrusions 22 and the cap 13 until the entire decorative light supporting structure 10 is covered with the string of lights 66. Skirt protrusions may be skipped or doubled up, according to preference. The string of lights may, of course, be wrapped around a protrusion 60 of the cap 13 and returned to an immediately adjacent skirt protrusion.

In the first preferred embodiment, the primary skirt members 14 all have the same shape, and the secondary skirt members 16 all have the same shape. These sets of identically manufactured parts reduce manufacturing costs and provide for compact storage. The decorative light-supporting structure of the presently preferred embodiment can be stored in a 30×10×25-inch box by nestling the primary 14 and secondary 16 skirt members and by placing the rigid support members 32, 44, 52, 53 side by side.

FIGS. 7 to 22 show a second preferred embodiment of the present invention. This embodiment includes an overall structure 110 that is shaped like a holiday item. The figures generally show the overall structure 110 in the form of a wreath, but it could be provided in any holiday form including, but not limited to, a candy cane, a snow man and a Jack O'Lantern. The list is endless.

Figure 7:
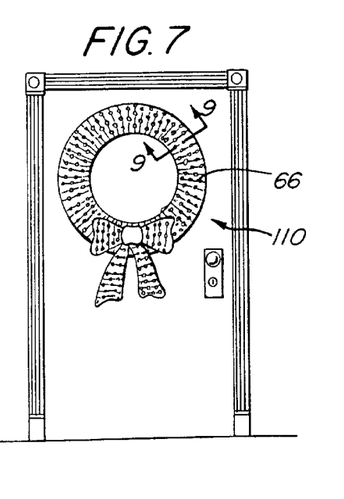
FIG. 7 is an elevational view of a second preferred decorative light-supporting structure of the present invention, shown here as a single layer overall structure which depicts a wreath.
Figure 8:
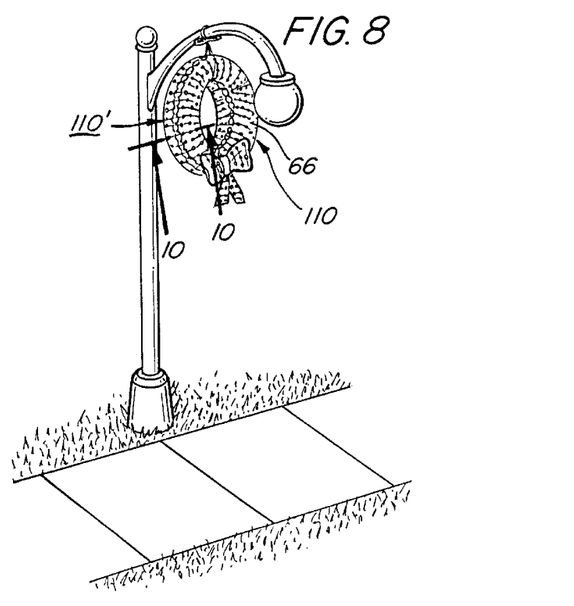
FIG. 8 is a perspective view of a variation on the second preferred embodiment of the present invention, shown here as a double layer, fully dimensioned overall structure which also depicts a wreath.
Figures 15, 16:
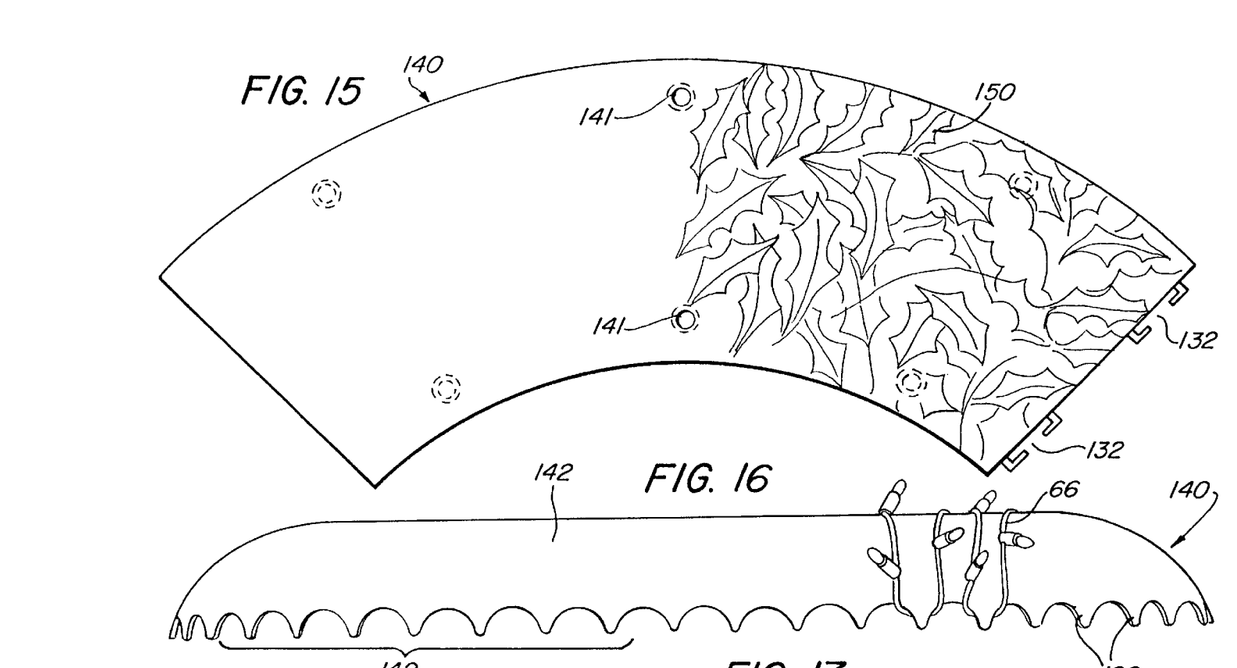
FIG. 15 is a top plan view of a component member.
FIG. 16 is a side view of the component member of FIG. 15 showing the outer edge.

The overall structure 110 may be displayed in a variety of ways, such as on a door (FIG. 7) or hanging from a lamp post (FIG. 8). The overall structure 110 beneficially has the shape and volume of the holiday item, even when unlighted. Moreover, the overall structure 110 may be embossed with a decorative pattern 150, as shown in FIG. 15, to further enhance its unlighted appearance. The overall structure 110, however, is intended to carry a string of lights 66. For that purpose, the overall structure 110 includes at least one compound edge, as described more fully below, which carries plurality of light-routing members 122.

As also shown by closely comparing FIGS. 7 and 8, the preferred overall structure 110 generally comprises a single layer structure (FIG. 7). As described more fully below, however, a first structure 110 may be connected to the back of a second structure 110' to form a fully dimensioned, double layer overall structure 110, 110' (FIG. 8). The second overall structure 110', therefore, must be a mirror image of the first overall structure 110. The first and second overall structures 110, 110' shown in FIG. 8 are identical, of course, because the desired item is a circular wreath. If the desired item were an asymmetrical object such as a candy cane, however, then the first and second overall structures 110, 110' would not be identical.

Figures 9, 10, 11:
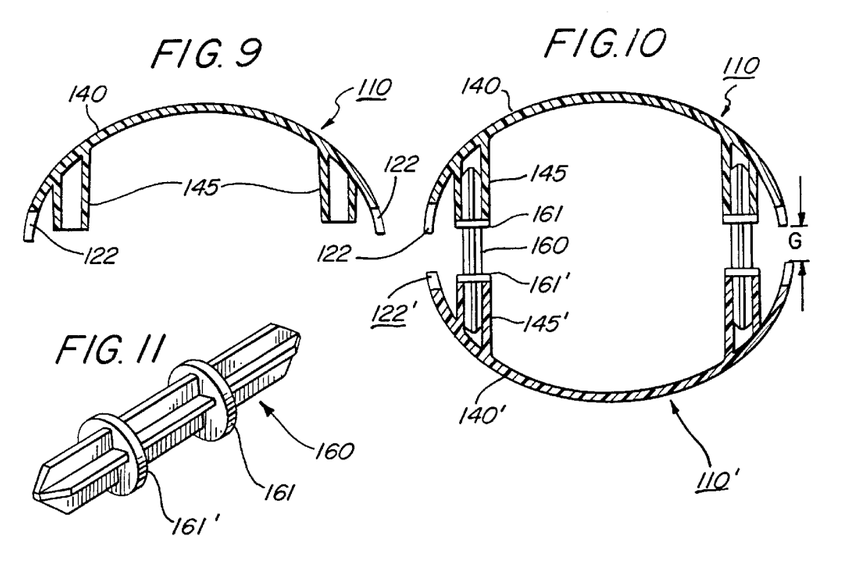
FIG. 9 is a cross-sectional view of one component member of FIG. 7, taken along section lines 9—9.
FIG. 10 is a cross-sectional view of the two component members of FIG. 8, taken along section lines 10—10.
FIG. 11 is a perspective view of a long connector pin used to connect two single layer component members to form the double layer, fully dimensioned overall structure of FIGS. 8 and 10.
Figure 12:
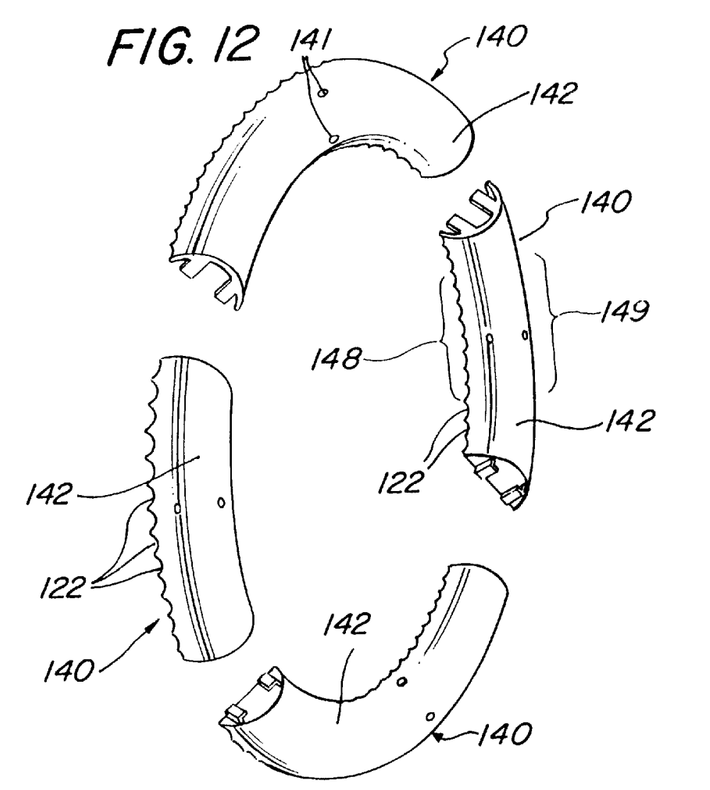
FIG. 12 is a perspective view of the second preferred embodiment including a plurality of component members which are connected together to form an overall structure corresponding to a wreath.
Figure 17:
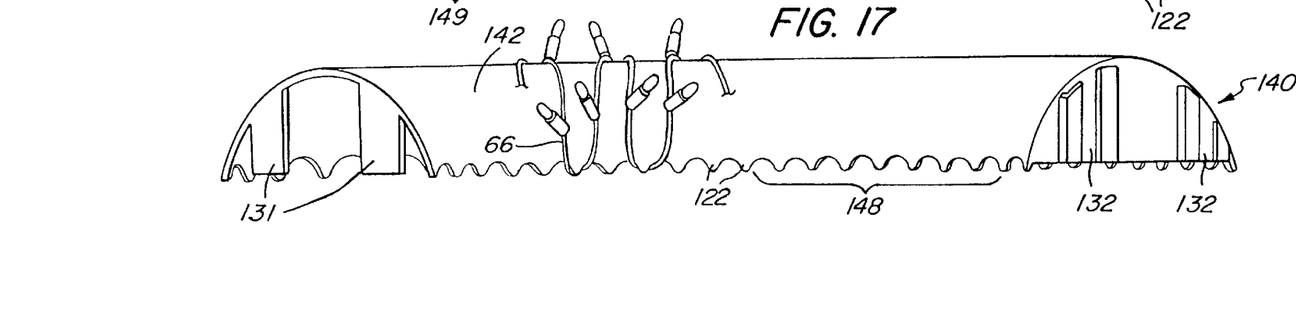
FIG. 17 is a side view of the component member of FIG. 15 showing the inner edge.

As best shown in FIG. 12, the overall structure 110 is preferably formed from a plurality of component members 140 that are detachably connected to one another. Each component member 140 is characterized by an upper light-supporting surface 142 which terminates at one or more lower component edges to define a three-dimensional volume that is a component part of the overall structure's three-dimensional volume. As best shown in FIG. 9, the preferred component member 140 has a substantially u-shaped profile. Referring to FIGS. 16 and 17, it can be seen that each component member 140 of the illustrated, wreath-shaped structure 110 comprises two ends and two component edges—an inner commponent edge 148 and an outer component edge 149. The component edges 148, 149 define a generally elongated, arcuate, u-shaped profile between the two ends.

Figure 13:
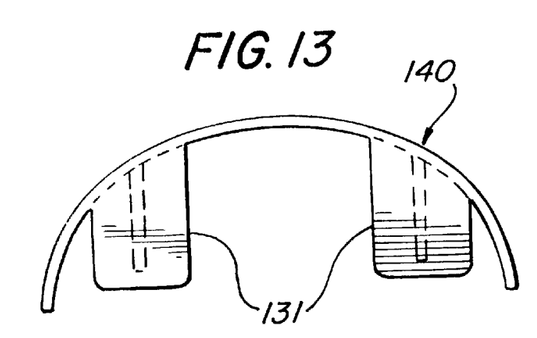
FIG. 13 is a first end view of a component member showing the tongues of a preferred tongue and groove connecting system.
Figure 14:
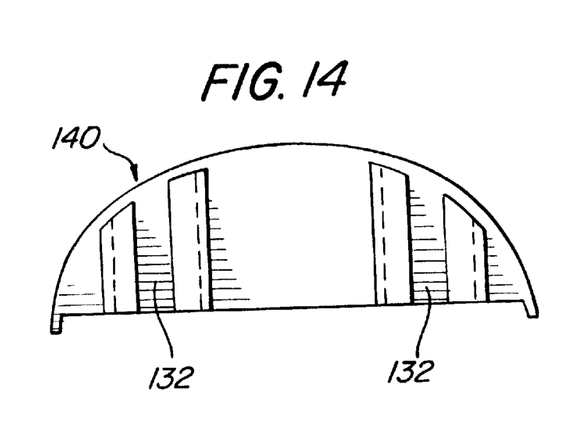
FIG. 14 is a second end view of a component member showing the grooves of the preferred tongue and groove connecting system.

The preferred means for detachably connecting each component member 140 to an adjacent component member 140 is an interlocking tongue 131 and corresponding groove 132. In the case of a wreath (as shown), each component member 140 has two tongues 131, 131 located at a first end and two grooves 132, 132 located at a second end. Accordingly, the tongues 131, 131 of each component member 140 may detachably enter the corresponding grooves 132, 132 of another component member when they are arranged end to end.

Figure 21A:
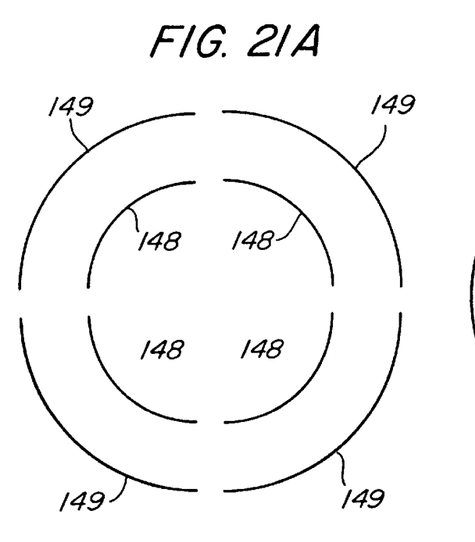
FIGS. 21A and 21B are diagrams showing the relationship between the component edges 148, 149 of the component members 140 and the compound edges 248, 249 of an overall structure 110 shaped like a wreath.
Figure 21B:
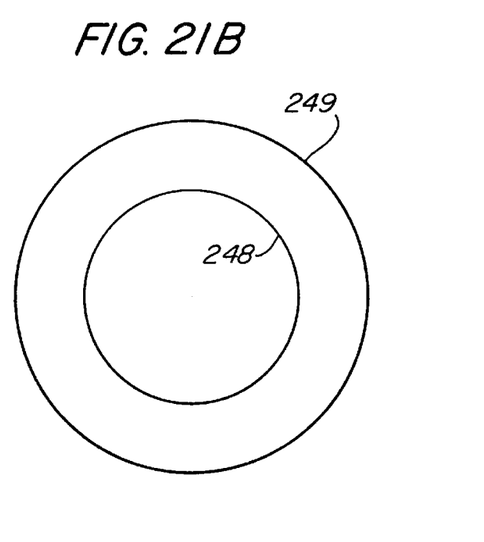

As suggested by FIGS. 21A and 21B, the overall structure 110 shaped like a wreath has two compound edges 248, 249 that are defined by the component edges 148, 149 of the connected plurality of component members 140. The light-routing members 122 are beneficially combined along the compound edges 248, 249 to permit a string of lights 66 (see FIGS. 7, 8, 16 and 17) to be routed back and forth therebetween, over and against the upper light-supporting surfaces 142 of the component members 140, to closely conform the string of lights 66 to the shape of the larger, overall structure 110, thereby depicting the holiday item by not only shape and volume, but also by illumination. Significantly, the shape and volume of the underlying structure remains visible behind the closely wrapped string of lights 66, even when the lights are off.

Figure 22A:
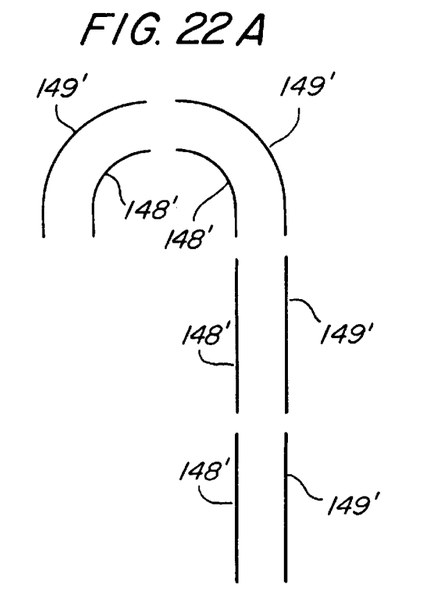
FIGS. 22A and 22B are diagrams showing the relationship between the component edges 148', 149' and the compound edges 248', 249' of an overall structure shaped like a candy cane.
Figure 22B:
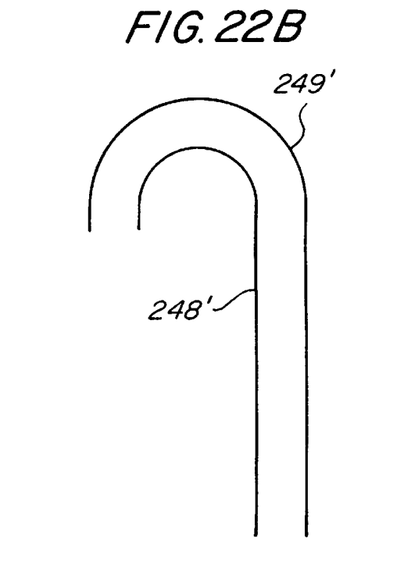

As best shown by comparing FIGS. 21A and 21B, the component edges 148, 149 of the component members 140 combine, respectively, to form the compound edges 248, 249 of the overall structure 110. This same concept could be applied to an overall structure of any shape. FIGS. 22A and 22B illustrate, for example, a plurality of component edges 148', 149' that combine to form two compound edges 248', 249' having a candy cane shape. The illustrated examples have two distinct, compound edges (248, 249 and 248', 249'), but that is not a mandatory feature of the present invention. The invention could reside in a structure having a single compound edge, a string of lights being woven from one part of that edge to another. The invention could also reside in a more complicated structure having three or more compound edges.

The light-routing members 122 of the preferred embodiment comprise scallops that are molded into the component edges 148, 149. In the case of a wreath, as best shown in FIGS. 16 and 17, the spacing between the light-routing members 122 is larger along the outer component edge 149 (FIG. 16) than along the inner component edge 148 (FIG. 17). This variance in spacing permits the string of lights 66 to appear more even when woven onto the overall structure 110 between the inner compound edge 248 and outer compound edge 249.

FIGS. 9–11 show a preferred means for connecting the first structure 110 to the second structure 110' to form the fully dimensioned, double layer structure 110, 110' of FIG. 8 which is visible in full volume from all sides. As shown, a first component member 140 is connected to a second component member 140'. The preferred connecting means comprises a long connector pin 160 and aligned protrusions 145, 145' formed on a backside of the respective component members 140, 140'. The connector pin 160 is not used, of course, for the single layer structure of FIGS. 7 and 9, but is received by the corresponding protrusions 145, 145' to form the double layer structure 110, 110' of FIGS. 8 and 10. The preferred connector pin 160 includes two spaced-apart annular stops 161, 161' which limit how far the connector pin 160 may enter the protrusions 145, 145' and maintain a gap "G" between the structures 110, 110' to permit strings of lights 66 to be easily woven, back and forth, between the respective light-routing members 122, 122', on one side or the other, after the double layer structure 110, 110' has been assembled.

Figures 18, 19, 20:
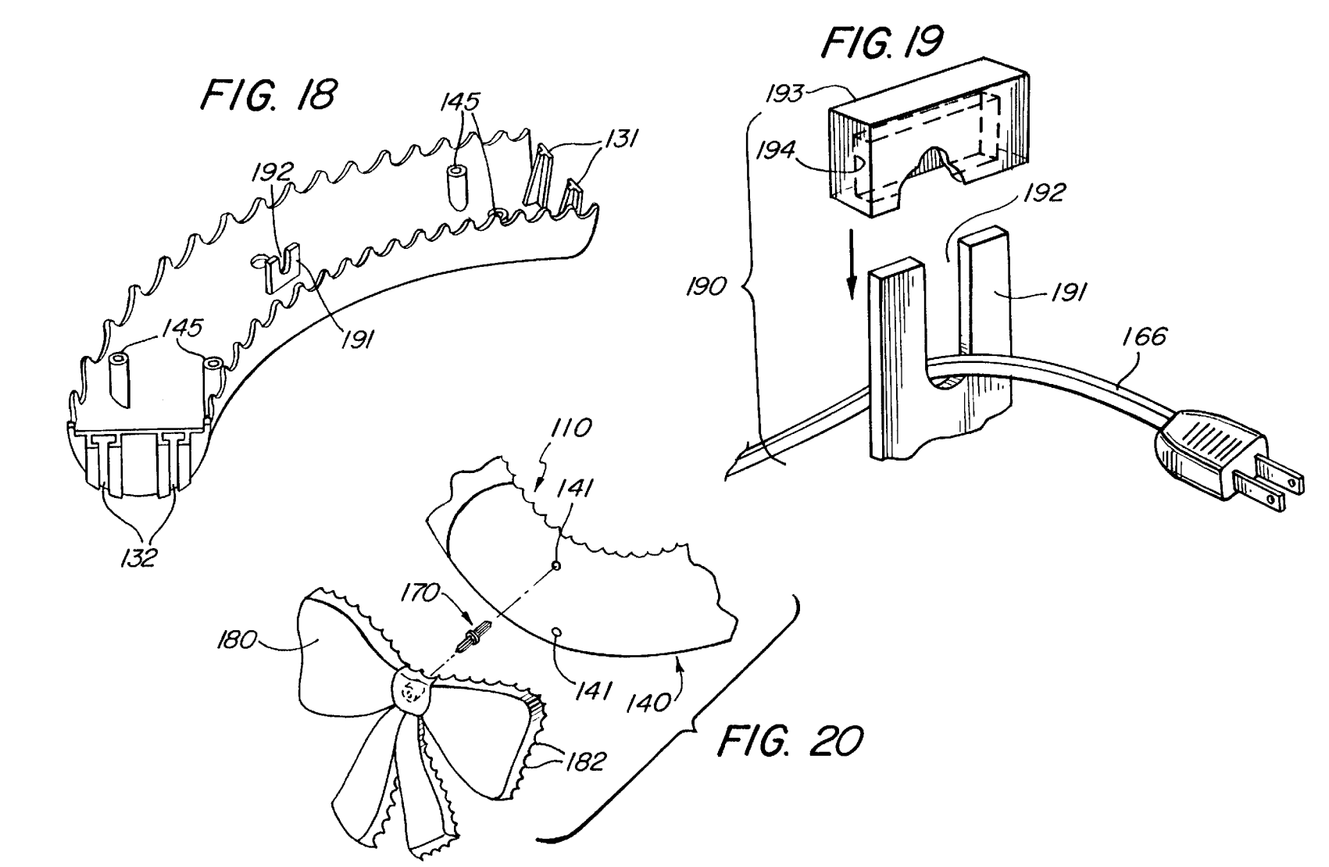
FIG. 18 is a perspective backside view of a component member from the light-supporting structure of FIG. 12.
FIG. 19 is a perspective view of a preferred cord holder used in each component member.
FIG. 20 is a perspective view of an auxiliary component which may be connected to a front side of a component member of the second preferred light-supporting structure using a short connector pin.

FIG. 20 shows an auxiliary component 180 which may be connected to the overall structure 110. The preferred means for connecting the auxiliary component 180 is a short connector pin 170, a hole 141 in the structure 110, and a hole (not shown) in the auxiliary component 180. The auxiliary component 180 of FIG. 20 is a bow for a wreath. Accordingly, at least for the case of a wreath, the hole 141 is preferably located on a component member's upper light-supporting surface 142, as shown in FIGS. 12 and 15. The auxiliary component 180 preferably includes a plurality of light-routing members 182 so that it too may carry a string of lights as shown, for example, in FIGS. 7 and 8. The preferred light-routing members 182 comprise a plurality of scallops that are molded into the edge of the auxiliary component 180.

Other auxiliary components could be used to customize the wreath-shaped structure 110, or any other shaped structure, for different occasions. For example, the auxiliary component could be shaped like a cat, and strung with blue lights, to simulate a black cat for Halloween, or the auxiliary component could be shaped like the Star of David for Hanukah.

Finally, FIGS. 18 and 19 illustrate a preferred cord holder 190 used in the second preferred embodiment of the present invention. The preferred cord holder 190 comprises a lower fork member 191 and a cap 193. The lower fork member 191 is molded into the backside of the component member 140 and includes a slot 192, as shown, for receiving a cord 166 which leads to the string of lights 66. The cap 193 includes an aperture 194 that fits over the lower fork member 191 to easily and securely capture the cord 166.

Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

We claim:

1. A decorative light-supporting structure for supportably routing a string of lights to depict a holiday item by shape, volume and illumination, comprising:

a plurality of component members characterized by an upper light-supporting surface which terminates at a lower component edge, wherein the upper light-supporting surface defines a three-dimensional volume, and wherein the plurality of component members collectively form a larger, overall structure having a shape and volume corresponding to the holiday item;

means for detachably connecting the plurality of component members together to form the larger, overall structure, whereby the plurality of component members may be disconnected from one another for storage and connected together to form the overall structure and depict the holiday item by shape and volume;

a compound edge of the overall structure defined by the component edges of the connected plurality of component members; and a plurality of light-routing members extending from the compound edge of the overall structure whereby a string of lights may be routed back and forth between the light-routing members over and against the upper light-supporting surfaces of the component members to conform the string of lights to the shape and volume of the overall structure and thereby depict the holiday item by shape, volume and illumination.

2. The decorative light-supporting structure of claim 1 wherein each component member comprises two ends, wherein the lower component edge comprises an inner component edge and an outer component edge which define a generally elongated, arcuate shape between the two ends, and wherein the upper light-supporting surface is defined by an inverted, substantially U-shaped profile between the inner and outer component edges.

3. The decorative light-supporting structure of claim 2 wherein the means for detachably connecting the plurality of component members comprises means for detachably connecting each end of each component member to a corresponding end of another component member with the plurality of component members arranged in a circle to depict a wreath by volume and shape when the lights are off.

4. The decorative light-supporting structure of claim 3 wherein the means for detachably connecting each end of each component member to a corresponding end of another component member comprises:

a tongue located at a first end of each component member for detachably entering a groove of another component member; and a groove located at a second end of each component member for detachably receiving a corresponding tongue of another component member.

5. The decorative light-supporting structure of claim 3 wherein the compound edge of the overall structure comprises an inner compound edge and an outer compound edge, the inner compound edge defined by the inner component edges of the connected plurality of component members and the outer compound edge defined by the outer component edges of the connected plurality of component members.

6. The decorative light-supporting structure of claim 5 wherein the plurality of light-routing members extend respectively from the inner and outer compound edges, whereby a string of lights may be routed back and forth between the light-routing members of the inner compound edge and the light-routing members of the outer compound edge, against the upper-light-supporting surfaces of the component members, to conform the string of lights to the light-supporting surfaces of the component members and depict the wreath by shape, volume, and illumination when the lights are on.

7. The decorative light-supporting structure of claim 6 wherein the plurality of light-supporting members that extend from the inner and outer compound edges respectively comprise a plurality of protrusions.

8. The decorative light-supporting structure of claim 7 wherein the plurality of protrusions comprise a plurality of scallops molded into the inner and outer compound edges.

9. The decorative light-supporting structure of claim 7 wherein the protrusions that extend from the outer compound edge are spaced farther apart than the protrusions that extend from the inner compound edge to provide a substantially equal number of protrusions for evenly wrapping a string of lights therebetween.

10. The decorative light-supporting structure of claim 7 wherein the protrusions that extend from the outer compound edge are approximately equal in number to the protrusions that extend from the inner compound edge for evenly wrapping a string of lights therebetween.

11. The decorative light-supporting structure of claim 1 further comprising:

a first decorative light-supporting structure;

a second decorative light-supporting structure that is a mirror image of the first decorative light-supporting structure; and means for connecting a back side of a first component member of the first decorative light-supporting structure to a back side of a second component member of the second decorative light-supporting structure to form a fully dimensioned, double layer structure which is visible in shape and volume from all sides.

12. The decorative light-supporting structure of claim 11 wherein the first and second decorative light-supporting structures each have a substantially U-shaped profile and wherein the fully dimensioned, double layer structure formed by connecting the first and second decorative light-supporting structures together has a substantially circular profile.

13. The decorative light-supporting structure of claim 11 wherein the connecting means comprises:

a first aperture formed on the back side of a component member of the first light-supporting structure;

a second aperture formed on the back side of a component member of the second light-supporting structure and positioned thereon such that the second aperture is in alignment with the first aperture when the back side of the first component member is connected to the back side of the second component member; and a pin which is simultaneously received in the first and second apertures.

14. The decorative light-supporting structure of claim 13 wherein the pin is sufficiently long as to hold the first and second decorative light-supporting structures back-to-back with an gap therebetween to accommodate the routing of the string of lights about the respective light-routing members.

15. The decorative light-supporting structure of claim 14 wherein the pin comprises first and second annular stops that are larger than the first and second apertures to limit the depth of the pin's insertion therein, the first and second annular stops being sufficiently spaced from one another to hold the first and second decorative light-supporting structures back-to-back with a gap therebetween to accommodate the routing of the string of lights about the respective light-routing members.

16. A decorative light-supporting structure adapted to closely support a string of lights to depict a wreath by volume, shape, and illumination, comprising:

a plurality of component members having two ends, an inner component edge and an outer component edge which define a generally elongated, arcuate shape between the two ends, and an upper light-supporting surface defined by an inverted, substantially U-shaped profile between the inner component edge and the outer component edge;

means for detachably connecting each end of each component member to a corresponding end of another component member with the plurality of component members arranged in a circle to depict a wreath by volume and shape;

an inner compound edge defined by a plurality of inner component edges of a connected plurality of component members;

an outer component edge defined by a plurality of outer component edges of the connected plurality of component members; and a plurality of light-routing members extending respectively from the inner and outer component edges whereby a string of lights may be routed back and forth between the light-routing members of the inner and outer component edges, against the upper light-supporting surfaces of the component members, to closely conform the string of lights to the plurality of connected component members and depict the wreath by shape, volume, and illumination.

17. The decorative light-supporting structure of claim 16 wherein the means for detachably connecting each end of each component member to a corresponding end of another component member comprises:

a tongue located at a first end of each component member for detachably entering a groove of another component member; and a groove located at a second end of each component member for detachably receiving a corresponding tongue of another component member.

18. The decorative light-supporting structure of claim 16 wherein the plurality of light-supporting members that extend from the inner and outer component edges respectively comprise a plurality of protrusions.

19. The decorative light-supporting structure of claim 18 wherein the plurality of protrusions comprise a plurality of scallops.

20. The decorative light-supporting structure of claim 18 wherein the protrusions that extend from the outer compound edge are spaced farther apart than the protrusions that extend from the inner compound edge to provide a substantially equal number of protrusions for evenly wrapping a string of lights therebetween.

21. The decorative light-supporting structure of claim 18 wherein the protrusions that extend from the outer compound edge are approximately equal in number to the protrusions that extend from the inner compound edge for evenly wrapping a string of lights therebetween.

22. The decorative light-supporting structure of claim 16 further comprising means for connecting a back side of a first component member of a first decorative light-supporting structure to a back side of a second component member of a second decorative light-supporting structure to form a fully dimensioned wreath having a substantially circular profile which is visible in shape and volume from all sides.

23. The decorative light-supporting structure of claim 22 wherein the connecting means comprises:

a first aperture formed on the back side of a component member of the first light-supporting structure;

a second aperture formed on the back side of a component member of the second light-supporting structure and in alignment with the first aperture on the first light-supporting structure; and a pin which is simultaneously received in the first and second apertures.

24. The decorative light-supporting structure of claim 23 wherein the pin is sufficiently long as to hold the first and second decorative light-supporting structures back-to-back with an annular gap therebetween to accommodate the routing of the string of lights about the light-routing members of the first and second decorative light-supporting structures.

25. The decorative wreath of claim 23 wherein the pin comprises first and second annular stops that are larger than the first and second apertures to limit the depth of the pin's insertion therein, the first and second annular stops being sufficiently spaced from one another to hold the first and second decorative wreaths back-to-back with an annular gap therebetween to accommodate the routing of the string of lights about the light-routing members of the first and second decorative wreaths.

* * * * *